(12) United States Patent
Bianconcini et al.

(10) Patent No.: US 11,348,061 B2
(45) Date of Patent: May 31, 2022

(54) LOGISTICS MANAGEMENT PLATFORM FOR MODIFYING SCHEDULES IN REAL-TIME

(71) Applicant: Verizon Connect Development Limited, Sandyford (IE)

(72) Inventors: Tommaso Bianconcini, Florence (IT); Paolo Raiconi, Florence (IT); David Di Lorenzo, Florence (IT); Alessio Frusciante, Florence (IT); Luca Noce, Florence (IT); Giovanni Pini, Florence (IT)

(73) Assignee: Verizon Connect Development Limited, Dublin (IE)

( * ) Notice: Subject to any disclaimer, the term of this patent is extended or adjusted under 35 U.S.C. 154(b) by 872 days.

(21) Appl. No.: 15/851,236

(22) Filed: Dec. 21, 2017

(65) Prior Publication Data
US 2019/0197475 A1 Jun. 27, 2019

(51) Int. Cl.
*G06Q 10/08* (2012.01)
*G05D 1/02* (2020.01)
*G06Q 50/28* (2012.01)

(52) U.S. Cl.
CPC ..... *G06Q 10/08355* (2013.01); *G05D 1/0287* (2013.01); *G06Q 10/0838* (2013.01); *G06Q 50/28* (2013.01)

(58) Field of Classification Search
CPC ......... G06Q 10/08355; G06Q 10/0838; G06Q 50/28; G05D 1/0287
See application file for complete search history.

(56) References Cited

U.S. PATENT DOCUMENTS

| | | | |
|---|---|---|---|
| 10,380,522 B1 * | 8/2019 | Brahms | H04L 67/18 |
| 2008/0156618 A1 * | 7/2008 | Brain | B65G 37/005 |
| | | | 700/226 |
| 2015/0161667 A1 * | 6/2015 | Stevens | G06Q 10/083 |
| | | | 705/14.58 |
| 2017/0262804 A1 * | 9/2017 | Shroff | G06Q 10/0838 |

(Continued)

FOREIGN PATENT DOCUMENTS

KR 101901329 B1 * 9/2018

OTHER PUBLICATIONS

Michal Maciejewski, Dynamic Transport Services, 2014, 145-147 (Year: 2014).*

*Primary Examiner* — Resha Desai
*Assistant Examiner* — Ibrahim N El-Bathy

(57) ABSTRACT

A device can receive, from a client device, a request to modify a schedule that includes information identifying the set of deliveries that the fleet of vehicles is to perform. The device can generate a set of modified schedules using information included in the request and one or more routing techniques. The device can determine, for each modified schedule, of the set of modified schedules, one or more scores for ranking the set of modified schedules, such as a projected delivery time score, an operational cost score, and/or an overall score. The device can provide the set of modified schedules that have been scored to the client device. The device can receive a modified schedule that has been selected by the client device. The device can deploy the selected modified schedule to instruct the fleet of vehicles to perform an updated set of deliveries associated with the selected modified schedule.

20 Claims, 6 Drawing Sheets

(56) References Cited

U.S. PATENT DOCUMENTS

2018/0017405 A1* 1/2018 Chen ...................... H04W 4/02
2018/0374021 A1* 12/2018 Drayton ................ G06N 5/043
2019/0101401 A1* 4/2019 Balva ................ G01C 21/3438

* cited by examiner

Example Scores for Modified Schedules

| Modified Schedules | Projected delivery time score | Operational cost | Overall Score |
|---|---|---|---|
| Schedule 1 | 6.67 | 9.44 | 9.90 |
| Schedule 2 | 10.00 | 9.98 | 8.70 |
| ⋮ | ⋮ | ⋮ | ⋮ |
| Schedule N | 3.67 | 9.99 | 4.00 |

115
Determine scores for modified schedules

Logistics Management Platform

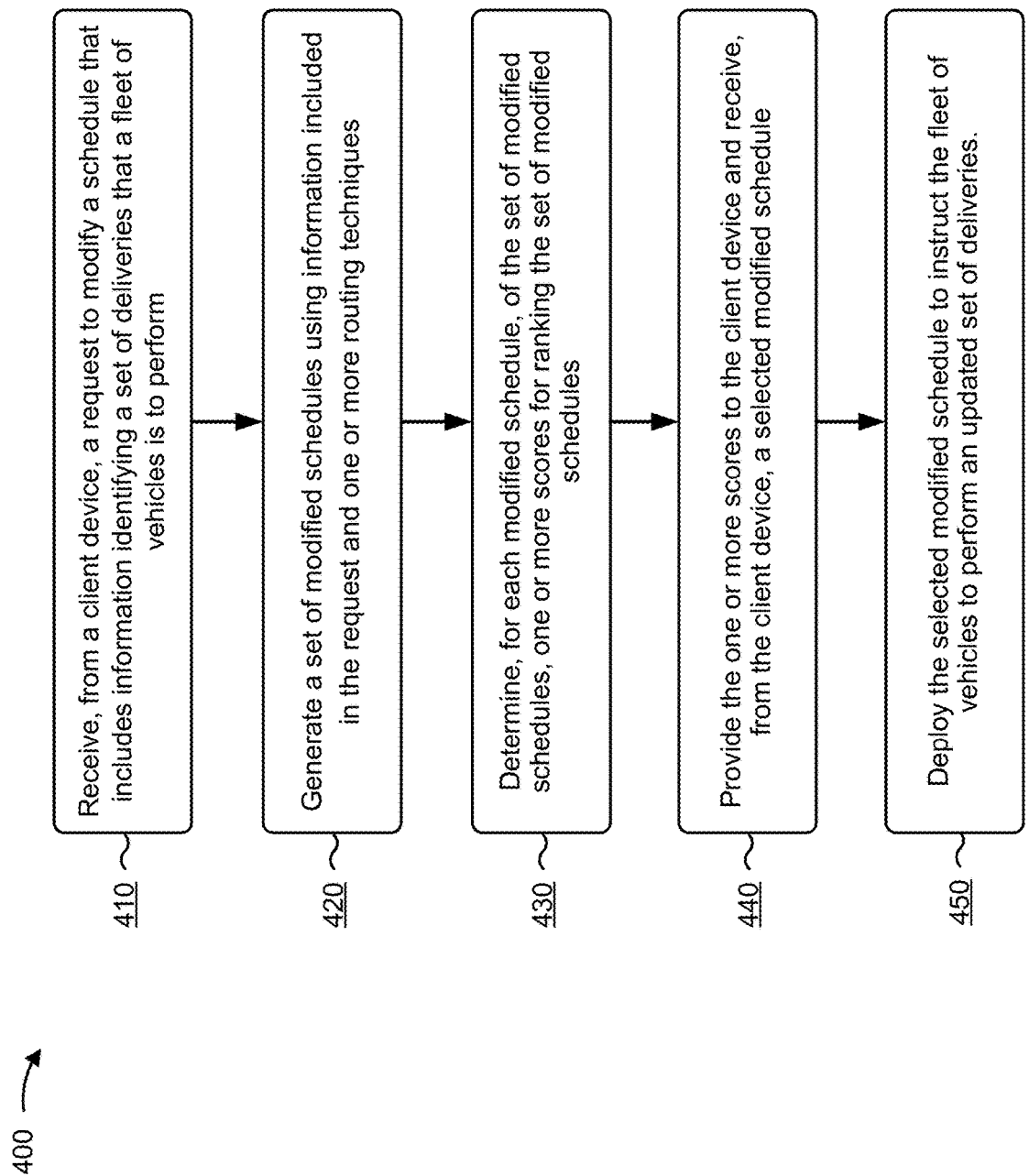

LOGISTICS MANAGEMENT PLATFORM FOR MODIFYING SCHEDULES IN REAL-TIME

BACKGROUND

A manager or a scheduler can schedule delivery of goods and/or services for an organization. For example, a fleet manager for a shipping company can schedule a team of drivers to perform deliveries.

BRIEF DESCRIPTION OF THE DRAWINGS

FIG. 4 is a flow chart of an example process for using a ranking technique to manage real-time modifications to schedules.

DETAILED DESCRIPTION OF PREFERRED EMBODIMENTS

Figure 1A:
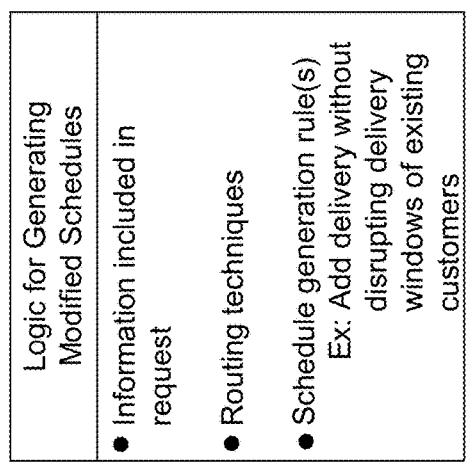
FIGS. 1A-1C are diagrams of an overview of an example implementation described herein.
Figure 1A:
Figure 1A:
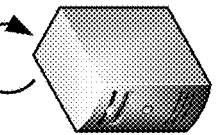
Figure 1A:
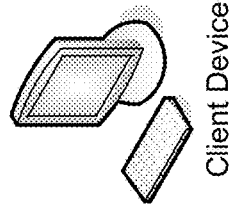

The following detailed description of example implementations refers to the accompanying drawings. The same reference numbers in different drawings can identify the same or similar elements.

An organization can provide delivery of goods and/or services to particular locations. For example, an organization can utilize a team of drivers and a fleet of vehicles to deliver millions, even billions, of goods and/or services to various locations worldwide. In this case, the organization might need a team of managers to handle logistics for thousands, tens of thousands, hundreds of thousands, or more of deliveries needed to deliver the goods and/or services.

However, using a team of managers to create schedules for the thousands, the tens of thousands, the hundreds of thousands, or more of deliveries can be difficult when schedules need to be modified in real-time. For example, real-time placement of new orders can alter delivery paths of vehicles, existing customers can change delivery windows (e.g., time ranges in which to deliver goods or services) or delivery locations, and/or the like. Furthermore, while a dynamic scheduling technique could be used to modify a schedule in real-time, the dynamic scheduling technique might modify the schedule in a way that negatively influences delivery windows of customers that already have deliveries scheduled, operational cost of performing the deliveries, and/or the like.

Some implementations described herein provide a logistics management platform to manage a real-time request to modify a schedule by generating a set of modified schedules that consider different routes that can be used to implement the modification, and using a ranking technique to rank the set of modified schedules based on each modified schedule's impact on customer delivery windows, operational costs to perform deliveries, and/or the like. For example, the logistics management platform can receive, from a client device, a request to add a delivery to a schedule that includes information identifying a set of deliveries that a fleet of vehicles is to perform. In this case, the logistics management platform can generate a set of modified schedules, where each schedule includes one or more delivery routes that the fleet of vehicles can use to perform the set of deliveries and the added delivery.

Additionally, the logistics management platform can determine, for each modified schedule, of the set of modified schedules, one or more scores for ranking the set of modified schedules. In this case, the logistics management platform can provide the one or more scores for display on a user interface of the client device, and a user can interact with the user interface to select a modified schedule of the set of modified schedules. Furthermore, the logistics management platform can deploy the selected modified schedule by instructing the fleet of vehicles to perform an updated set of deliveries associated with the selected modified schedule.

By scoring and ranking the set of modified schedules, the logistics management platform is able to identify one or more modified schedules that are beneficial both to a client organization and to end users. This conserves processing resources that might otherwise be used to generate inefficient delivery routes and process new requests made by the client device after receiving the inefficient delivery routes, conserves processing resources that might otherwise be used to generate delivery routes that cause drivers to miss deliveries during preferred delivery windows (which in turn leads to additional processing resources needed to add the missed delivery to a different schedule), conserves processing resources that might otherwise be used to execute error correction techniques, and/or the like. Furthermore, the logistics management platform reduces operational costs of the client organization, improves customer satisfaction by maximizing a number of end customers that receive deliveries within preferred delivery windows, and/or the like.

Figure 1B:
Figure 1C:
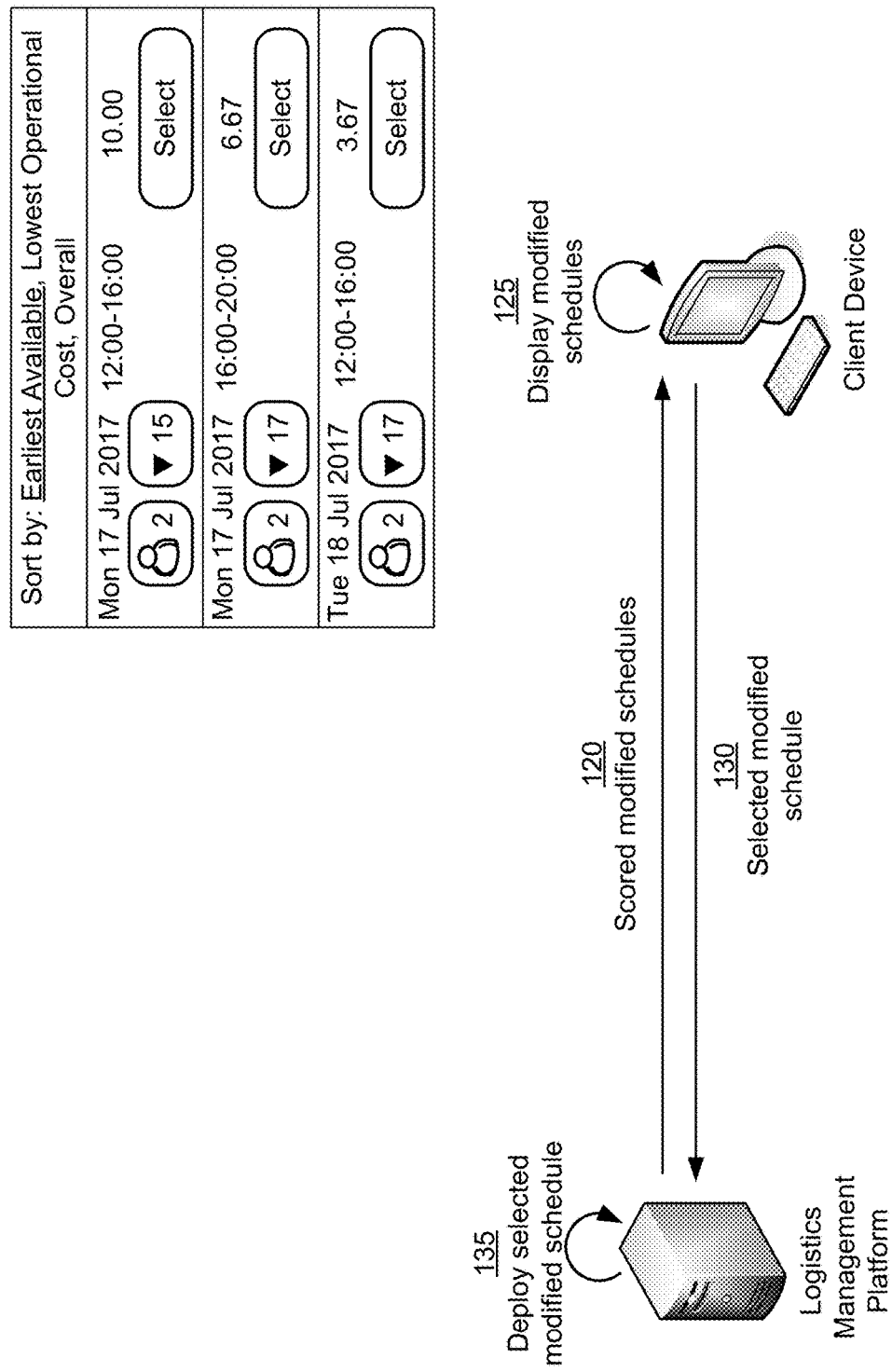

FIGS. 1A-1C are diagrams of an overview of an example implementation 100 described herein. As shown in FIGS. 1A-1C, example implementation 100 shows a logistics management platform interacting with a client device of a delivery organization to manage a real-time request to modify a schedule that is actively being used by drivers to perform a set of deliveries.

As shown in FIG. 1A, and by reference number 105, the logistics management platform can receive the request to modify the schedule. The request can be a request to add a delivery to the schedule, to remove a delivery from the schedule, to modify a delivery window associated with the schedule, and/or the like. The request can include information indicating a request type (e.g., to add or remove a delivery, to modify a delivery window, etc.), information indicating a delivery date, delivery window information (that identifies a preferred delivery time period for an end user), delivery location information for a delivery if the request is a request to add a delivery, information indicating a time on site (e.g., a time needed to perform an added delivery), information identifying a customer (e.g., a customer ID), capacity information (e.g., a weight of an item being delivered, a volume of the item being delivered, a number of 'slots' the item may take up in a vehicle, such as a seat in a vehicle or a predetermined space associated with the vehicle, etc.), and/or the like.

As shown as an example, the request type can be a request to add a delivery, where the delivery has a delivery date of Nov. 5, 2017, a delivery window of any time in the afternoon, a time on site of one hour, and a customer ID of 1234. In this case, an end user device (e.g., a device of a person wanting a delivery) can provide, to the client device, a request for a delivery of a good and/or a service. Additionally, the client device can process the request for the delivery of the good and/or the service to create a request to add the delivery to the schedule, and can provide the request to the logistics management platform.

Although example implementation 100 is described with respect to a single request, in practice, the logistics management platform can receive requests to modify thousands, tens of thousands, or even hundreds of thousands of schedules in real-time (e.g., real-time relative to the logistics management platform receiving the requests from one or more client devices).

As shown by reference number 110, the logistics management platform can generate a set of modified schedules. For example, the logistics management platform can use information included in the request and one or more routing techniques to generate the set of modified schedules. The set of modified schedules can be used to determine all (or some) possible routing paths, where drivers are able to carry out both existing deliveries and the requested added delivery.

In some implementations, the logistics management platform can generate the set of modified schedules using a schedule generation rule. For example, the logistics management platform can use a schedule generation rule as a constraint that can limit one or more possible routing paths from being used for a modified schedule.

As an example, a schedule generation rule can require that a delivery path selected for a modified schedule does not disrupt the delivery windows of existing customers. In this example, the logistics management platform can generate the set of modified schedules, such that routing paths are not considered unless the routing paths maintain the delivery windows of the existing customers.

In this way, the logistics management platform is able to receive a real-time request to modify the schedule, and is able to use the request to generate a set of modified schedules.

As shown in FIG. 1B, and by reference number 115, the logistics management platform can determine one or more scores for each modified schedule of the set of modified schedules. For example, the logistics management platform can determine one or more scores that can be used for ranking the set of modified schedules. The one or more scores can include a projected delivery time score, an operational cost score, an overall score that is based on the operational cost score and the projected delivery time score, and/or a similar type of score.

For example, the logistics management platform can, for each modified schedule, determine a projected delivery time score. In this example, the logistics management platform can determine a projected delivery time score for each modified schedule based on a time at which the added delivery is projected to be performed. In this case, higher scores can be assigned to modified schedules associated with delivery routes where the added delivery is to be performed earlier in the day, and lower scores can be assigned to modified schedules associated with delivery routes where the added delivery is to be performed later in the day. In this way, the projected delivery time scores provide a metric that can be used to represent how favorable each modified schedule is to the end-user.

Additionally, or alternatively, the logistics management platform can, for each modified schedule, determine an operational cost score associated with an operational cost of the modified schedule to the client organization. For example, the logistics management platform can determine an operational cost score by determining a fuel cost associated with vehicles performing deliveries associated with a modified schedule, a total amount of wages for drivers performing the deliveries associated with the modified schedule, and/or the like.

Additionally, or alternatively, the logistics management platform can, for each modified schedule, determine an overall score that is based on both the projected delivery time score and the operational cost score. For example, the logistics management platform can determine an overall score by determining a projected delivery time score for a modified schedule, by determining an operational cost score for the modified schedule, and by taking an average or a weighted average of the projected delivery time score and the operational cost score.

In this way, the logistics management platform is able to score a set of modified schedules that can be provided to the client device for further processing, as described below.

As shown in FIG. 1C, and by reference number 120, the logistics management platform can provide the scored set of modified schedules to the client device. As shown by reference number 125, the client device can display the scored set of modified schedules via a user interface. For example, the client device can display the set of modified schedules such that the user interface shows, for each modified schedule, a total number of drivers, a total number of deliveries, a delivery date, a delivery window for each delivery, a projected delivery time score, an operational cost score, an overall score, and a selectable button allowing the end-user to select a modified schedule. In some cases, as shown, the user interface can be sortable based on scores (e.g., the projected delivery time scores, the operational cost scores, the overall scores, etc.).

As shown by reference number 130, the end user can interact with the user interface of the client device to select a particular modified schedule, which can cause the logistics management platform to receive an indication that the particular modified schedule, of the set of modified schedules, has been selected (hereafter referred to as the selected schedule).

As shown by reference number 135, the logistics management platform can deploy the selected schedule. For example, the logistics management platform can provide the selected schedule to one or more user devices associated with drivers that are assigned to perform deliveries included in the selected schedule. Additionally, or alternatively, the logistics management platform can provide, to an autonomous vehicle, instructions for performing deliveries associated with the selected schedule. In this way, the logistics management platform is able to deploy the selected schedule in real-time, thereby providing the client device with a schedule that satisfies end-user delivery preferences, preferences of the delivery organization (e.g., to reduce operational cost), a balance between the end-user delivery preferences and the preferences of the delivery organization, and/or the like.

In some implementations, in addition to processing requests to modify schedules, the logistics management platform can support a digital marketplace that provides an end user with dynamically updated delivery fees. In this case, the logistics management platform (or a platform capable of interacting with the logistics management platform) can store delivery information (e.g., fee information for deliveries, location information for deliveries, etc.) relating to deliveries being performed in real-time. For example, if a large volume of users need deliveries in a similar geographic region, and drivers in the similar geographic region are already scheduled to perform nearby deliveries, delivery fees for that geographic region might decrease. As another example, if the similar geographic region does not have any drivers already scheduled to perform deliveries, the delivery fees might rise as the operational cost of servicing the new customers would be higher.

Additionally, the logistics management platform can set thresholds, such that if a delivery fee satisfies a threshold (e.g., a delivery fee exceeds a threshold amount), the logistics management platform can provide, to a device of an end user, an offer including a different delivery fee in exchange for accepting a different delivery window, a different delivery location, and/or the like. This can create a situation where the end user benefits from a lower price, while a delivery company also benefits by using more efficient delivery routes that are available in other delivery windows, thereby reducing operational cost.

In this way, the logistics management platform is able to identify and provide one or more modified schedules to the client device that are beneficial to the client organization, beneficial to one or more end users, or beneficial to both the client organization and the one or more end users. Furthermore, the logistics management platform conserves processing resources that might otherwise be used to generate inefficient schedules, schedules that do not schedule deliveries within delivery windows (which can cause the logistics management platform to spend processing resources rescheduling deliveries), and/or the like.

As indicated above, FIGS. 1A-1C are provided merely as an example. Other examples are possible and can differ from what was described with regard to FIGS. 1A-1C. For example, while example implementation 100 shows the logistics management platform scheduling performance of deliveries, in practice, implementations may use the logistics management platform to perform pickups (e.g., to pick up a package from a particular location), to perform delivery or pickup of a service (as opposed to a good), such as service that can be performed by a plumber, an electrician, a cleaner, etc., and/or the like.

Additionally, there can be additional devices and/or networks, fewer devices and/or networks, different devices and/or networks, or differently arranged devices and/or networks than those shown in FIGS. 1A-1C. Furthermore, two or more devices shown in FIGS. 1A-1C can be implemented within a single device, or a single device shown in FIGS. 1A-1C can be implemented as multiple, distributed devices. Additionally, or alternatively, a set of devices (e.g., one or more devices) of example implementation 100 can perform one or more functions described as being performed by another set of devices of example implementation 100.

Figure 2:
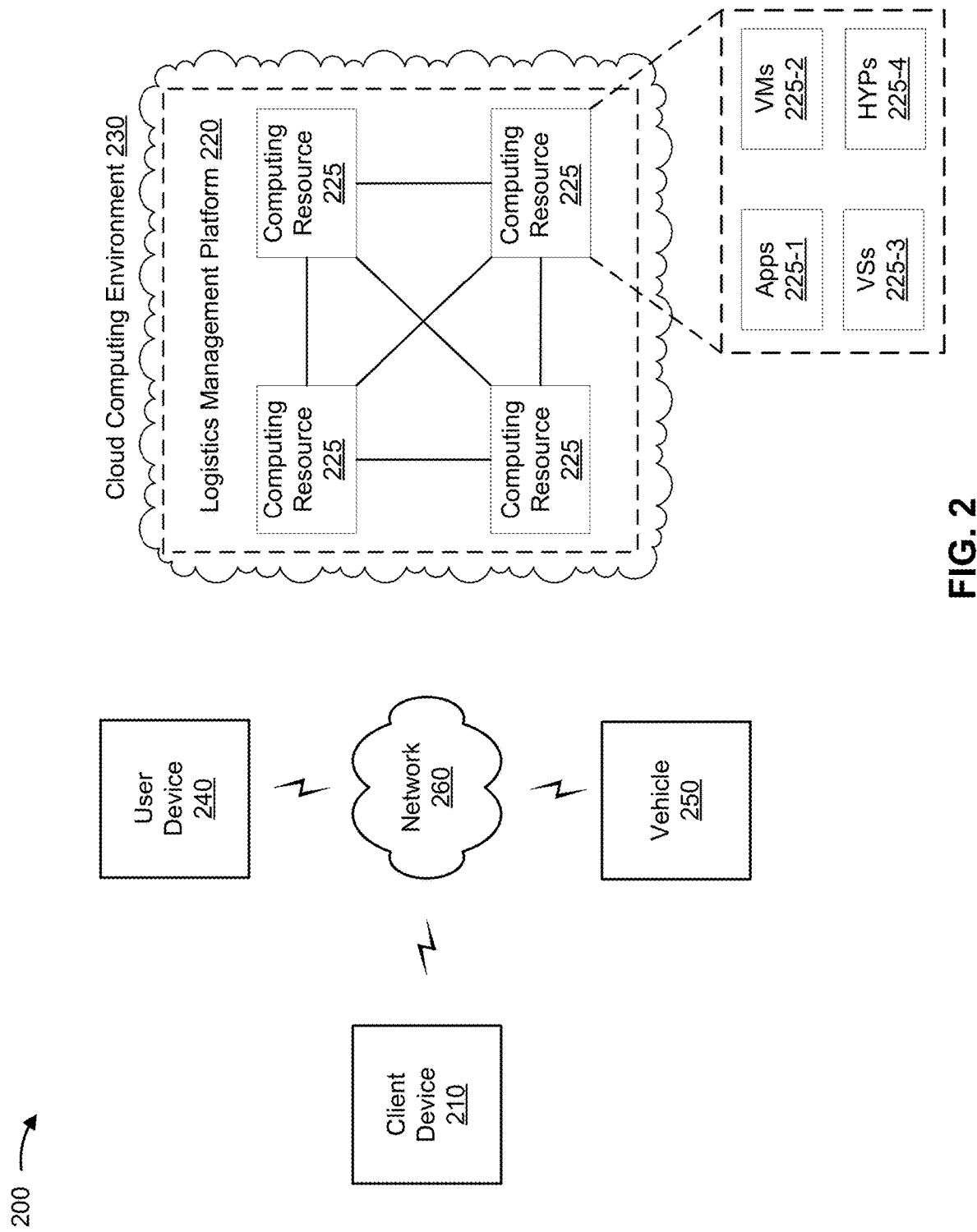
FIG. 2 is a diagram of an example environment in which systems and/or methods, described herein, can be implemented.

FIG. 2 is a diagram of an example environment 200 in which systems and/or methods, described herein, can be implemented. As shown in FIG. 2, environment 200 can include a client device 210, a logistics management platform 220 hosted by a cloud computing environment 230, a user device 240, vehicle 250, and/or a network 260. Devices of environment 200 can interconnect via wired connections, wireless connections, optical connections, or a combination of connections.

Client device 210 includes one or more devices capable of receiving, generating, storing, processing, and/or providing information associated with modifying a schedule. For example, client device 210 can include a communication and/or computing device, such as a phone (e.g., a mobile phone, such as a smartphone, a radiotelephone, etc.), a laptop computer, a tablet computer, a handheld computer, a gaming device, a wearable communication device (e.g., a smart wristwatch, a pair of smart eyeglasses, etc.), a global positioning system (GPS) device, an electronic control unit (ECU) of a vehicle, an engine control module (ECM) of a vehicle, or a similar type of device.

In some implementations, client device 210 can provide a request to modify a schedule to logistics management platform 220. In some implementations, client device 210 can receive, from logistics management platform 220, a set of modified schedules. In some implementations, a user can interact with client device 210 to select one of the modified schedules, which can cause the modified schedule that has been selected to be provided to logistics management platform 220.

Logistics management platform 220 includes one or more devices capable of receiving, storing, generating, processing, and/or providing information associated with modifying a schedule. For example, logistics management platform 220 can include a server device (e.g., a host server, a web server, an application server, etc.), a data center device, or a similar device.

In some implementations, as shown, logistics management platform 220 can be hosted in cloud computing environment 230. Notably, while implementations described herein describe logistics management platform 220 as being hosted in cloud computing environment 230, in some implementations, logistics management platform 220 might not be cloud-based (i.e., can be implemented outside of a cloud computing environment) or might be partially cloud-based.

Cloud computing environment 230 includes an environment that hosts logistics management platform 220. Cloud computing environment 230 can provide computation, software, data access, storage, and/or other services that do not require end-user knowledge of a physical location and configuration of system(s) and/or device(s) that host logistics management platform 220. As shown, cloud computing environment 230 can include a group of computing resource 225 (referred to collectively as "computing resources 225 and individually as "computing resource 225").

Computing resource 225 includes one or more personal computers, workstation computers, server devices, or another type of computation and/or communication device. In some implementations, computing resource 225 can host logistics management platform 220. The cloud resources can include compute instances executing in computing resource 225, storage devices provided in computing resource 225, data transfer devices provided by computing resource 225, etc. In some implementations, computing resource 225 can communicate with other computing resources 225 via wired connections, wireless connections, or a combination of wired and wireless connections.

As further shown in FIG. 2, computing resource 225 can include a group of cloud resources, such as one or more applications ("APPs") 225-1, one or more virtual machines ("VMs") 225-2, virtualized storage ("VSs") 225-3, one or more hypervisors ("HYPs") 225-4, or the like.

Application 225-1 includes one or more software applications that can be provided to or accessed by client device 210. Application 225-1 can eliminate a need to install and execute the software applications on client device 210. For example, application 225-1 can include software associated with logistics management platform 220 and/or any other software capable of being provided via cloud computing environment 230. In some implementations, one application 225-1 can send/receive information to/from one or more other applications 225-1, via virtual machine 225-2.

Virtual machine 225-2 includes a software implementation of a machine (e.g., a computer) that executes programs like a physical machine. Virtual machine 225-2 can be either a system virtual machine or a process virtual machine, depending upon use and degree of correspondence to any real machine by virtual machine 225-2. A system virtual machine can provide a complete system platform that supports execution of a complete operating system ("OS"). A process virtual machine can execute a single program, and can support a single process. In some implementations, virtual machine 225-2 can execute on behalf of a user (e.g., client device 210), and can manage infrastructure of cloud computing environment 230, such as data management, synchronization, or long-duration data transfers.

Virtualized storage 225-3 includes one or more storage systems and/or one or more devices that use virtualization techniques within the storage systems or devices of computing resource 225. In some implementations, within the context of a storage system, types of virtualizations can include block virtualization and file virtualization. Block virtualization can refer to abstraction (or separation) of logical storage from physical storage so that the storage system can be accessed without regard to physical storage or heterogeneous structure. The separation can permit administrators of the storage system flexibility in how the administrators manage storage for end users. File virtualization can eliminate dependencies between data accessed at a file level and a location where files are physically stored. This can enable optimization of storage use, server consolidation, and/or performance of non-disruptive file migrations.

Hypervisor 225-4 provides hardware virtualization techniques that allow multiple operating systems (e.g., "guest operating systems") to execute concurrently on a host computer, such as computing resource 225. Hypervisor 225-4 can present a virtual operating platform to the guest operating systems, and can manage the execution of the guest operating systems. Multiple instances of a variety of operating systems can share virtualized hardware resources.

User device 240 includes one or more devices capable of receiving, generating, storing, processing, and/or providing information associated with modifying a schedule. For example, user device 240 can include a communication and/or computing device, such as a phone (e.g., a mobile phone, such as a smartphone, a radiotelephone, etc.), a laptop computer, a tablet computer, a handheld computer, a gaming device, a wearable communication device (e.g., a smart wristwatch, a pair of smart eyeglasses, etc.), or a similar type of device.

In some implementations, user device 240 can provide, to client device 210, a request for a new delivery or to modify an existing delivery. In some implementations, user device 240 can receive, from logistics management platform 220 or a different cloud services platform, an offer to accept a different delivery fee (e.g., a lower delivery fee) in exchange for accepting a different delivery window, a different delivery location, and/or the like. In some implementations, user device 240 can provide, to logistics management platform 220 or the different cloud services platform, an acceptance of the different delivery fee.

Vehicle 250 includes one or more vehicles capable of performing a set of deliveries. For example, vehicle 250 an include a car, a truck, a boat, a plane, a ship, a drone, an autonomous vehicle, and/or a similar type of vehicle. In some cases, one or more implementations described herein can be performed by autonomous vehicles, rather than vehicles operated by human drivers.

Network 260 includes one or more wired and/or wireless networks. For example, network 260 can include a cellular network (e.g., a fifth generation (5G) network, a fourth generation (4G) network, such as a long-term evolution (LTE) network, a third generation (3G) network, a code division multiple access (CDMA) network, another type of advanced generated network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there can be additional devices and/or networks, fewer devices and/or networks, different devices and/or networks, or differently arranged devices and/or networks than those shown in FIG. 2. Furthermore, two or more devices shown in FIG. 2 can be implemented within a single device, or a single device shown in FIG. 2 can be implemented as multiple, distributed devices. Additionally, or alternatively, a set of devices (e.g., one or more devices) of environment 200 can perform one or more functions described as being performed by another set of devices of environment 200.

Figure 3:
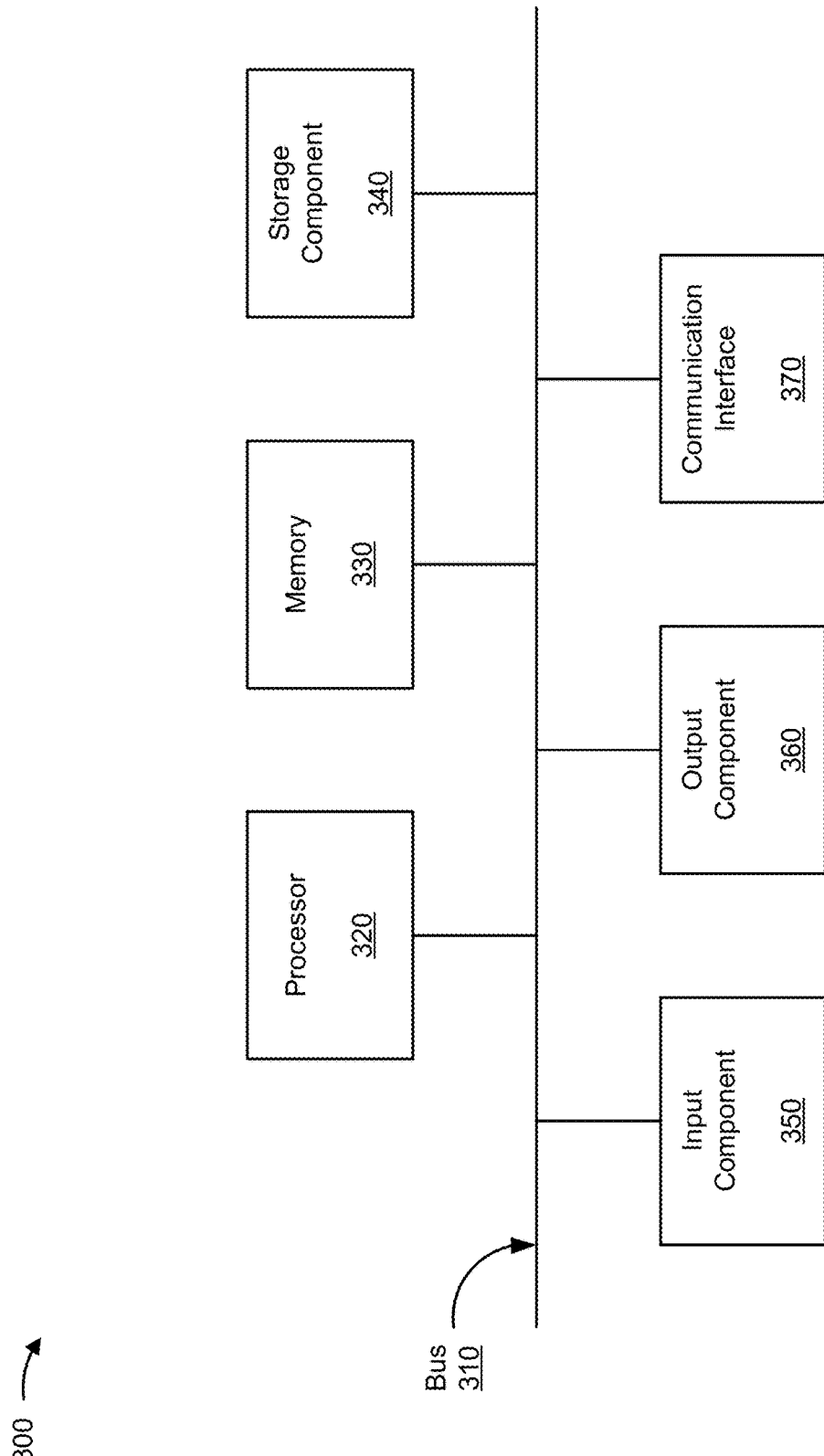
FIG. 3 is a diagram of example components of one or more devices of FIG. 2.

FIG. 3 is a diagram of example components of a device 300. Device 300 can correspond to client device 210, logistics management platform 220, user device 240, and/or vehicle 250. In some implementations, client device 210, logistics management platform 220, user device 240, and/or vehicle 250 can include one or more devices 300 and/or one or more components of device 300. As shown in FIG. 3, device 300 can include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 includes a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 can include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 can include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 can permit device 300 to receive information from another device and/or provide information to another device. For example, communication interface 370 can include an Ethernet interface, an optical interface, a coaxial interface, an infrared interface, a radio frequency (RF) interface, a universal serial bus (USB) interface, a Wi-Fi interface, a cellular network interface, or the like.

Device 300 can perform one or more processes described herein. Device 300 can perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions can be read into memory 330 and/or storage component 340 from another computer-readable medium or from another device via communication interface 370. When executed, software instructions stored in memory 330 and/or storage component 340 can cause processor 320 to perform one or more processes described herein. Additionally, or alternatively, hardwired circuitry can be used in location of or in combination with software instructions to perform one or more processes described herein. Thus, implementations described herein are not limited to any specific combination of hardware circuitry and software.

The number and arrangement of components shown in FIG. 3 are provided as an example. In practice, device 300 can include additional components, fewer components, different components, or differently arranged components than those shown in FIG. 3. Additionally, or alternatively, a set of components (e.g., one or more components) of device 300 can perform one or more functions described as being performed by another set of components of device 300.

FIG. 4 is a flow chart of an example process 400 for using a ranking technique to manage real-time modifications to schedules. In some implementations, one or more process blocks of FIG. 4 can be performed by logistics management platform 220. In some implementations, one or more process blocks of FIG. 4 can be performed by another device or a group of devices separate from or including client device 210 and/or user device 240.

As shown in FIG. 4, process 400 can include receiving, from a client device, a request to modify a schedule that includes information identifying a set of deliveries that a fleet of vehicles is to perform (block 410). For example, logistics management platform 220 can receive, from client device 210, a request to add a delivery to a schedule, to remove a delivery from the schedule, to modify a delivery window used for a delivery included in the schedule, and/or the like.

In some implementations, logistics management platform 220 can manage schedules. For example, logistics management platform 220 can support generation and maintenance schedules, where each schedule pairs a fleet of vehicles with a group of drivers for using one or more delivery routes to perform a set of deliveries. In some implementations, logistics management platform 220 can manage schedules using a website that client device 210 is able to interact with to generate, modify, and/or view one or more schedules. In some implementations, logistics management platform 220 can manage schedules using a downloadable program that can be hosted on client device 210, whereby the program includes a user interface that allows users to generate, modify, and/or view one or more schedules.

In some implementations, logistics management platform 220 can support a feature for modifying schedules. For example, logistics management platform 220 can provide a user interface element (e.g., a button, a menu item, and/or the like) that can be selected by a user to request a particular modification desired by the user. In this case, the feature can include an element for adding an additional delivery to the schedule, for removing a delivery from the schedule, for modifying a delivery window associated with the schedule, and/or the like.

In some implementations, an end user can use user device 240 to interact with a service (e.g., a website) provided by a delivery organization to place a delivery request. For example, a user can interact with the service to input a delivery request, such as a request to add a delivery, a delivery request associated with modifying a delivery (e.g., to change a delivery window, a delivery location, etc.), and/or the like. In this case, the delivery request can be sent to client device 210, and client device 210 can use the request to generate the request to modify the schedule.

In some cases, the user can interact with a digital marketplace that stores dynamically updated delivery fees based on demand associated with particular deliveries. Here, the user can select a particular delivery location and a particular delivery window, which can be associated with a particular delivery fee, and the particular delivery location, the particular delivery window, and the particular delivery fee can be sent to client device 210 to be used as part of a request to modify the schedule. Additional information relating to the digital marketplace is described further herein.

In some implementations, logistics management platform 220 can receive the request to modify the schedule that includes information identifying a set of deliveries that a fleet of vehicles is to perform. The request can include information indicating a request type (e.g., to add or remove a delivery, to modify a delivery window, etc.), information indicating a delivery date, delivery window information (that identifies a preferred delivery time period for an end user), delivery location information for a delivery if the request is a request to add a delivery, information indicating a time on site (e.g., a time needed to perform an added delivery), information identifying a customer (e.g., a customer ID), capacity information (e.g., a weight of an item being delivered, a volume of the item being delivered, a number of 'slots' the item may take up a in vehicle, such as a seat in a vehicle or a predetermined space associated with the vehicle etc.), and/or the like.

In some implementations, logistics management platform 220 can receive requests to modify thousands, tens of thousands, even hundreds of thousands of schedules in real-time (e.g., real-time relative to a time at which logistics management platform 220 receives each request). For example, logistics management platform 220 can process a large volume of requests concurrently, can utilize a batch scheduling and processing technique to process the requests, and/or the like. In this way, logistics management platform 220 is able to process large volumes of data, such that a human operator or an inferior logistics management platform would be objectively unable to process.

In this way, logistics management platform 220 is able to receive a request to modify a schedule in real-time.

As further shown in FIG. 4, process 400 can include generating a set of modified schedules using information included in the request and one or more routing techniques (block 420). For example, logistics management platform 220 can generate a set of modified schedules, where each modified schedule uses one or more delivery routes to perform deliveries (e.g., already scheduled deliveries, an additional delivery requested by client device 210, etc.).

In some implementations, logistics management platform 220 can generate the set of modified schedules using a routing technique. For example, logistics management platform 220 can provide information included in the request and information associated with the schedule (e.g., delivery information for deliveries scheduled prior to the request to modify the schedule) as input to a routing technique (e.g., a Tabu Search technique, a genetic algorithm, a metaheuristic algorithm, a linear programming model, etc.) to cause the routing technique to output the set of modified schedules. In this case, each modified schedule can include information assigning the team of vehicles to perform the set of deliveries and the requested modification using a different set of delivery routes. In this way, logistics management platform 220 is able to generate modified schedules that include a number of possible delivery routes that can be scored and ranked based on each modified schedules impact to delivery windows, operational cost, and/or the like, as described further herein.

As an example, logistics management platform 220 can generate a set of modified schedules based on a request to add a delivery to the schedule. For example, the request can specify to add a delivery to the schedule, can include information indicating a delivery location for the added delivery, a delivery window, a customer ID associated with a customer placing the added delivery, and/or the like. In this case, logistics management platform 220 can process the request to generate a set of modified schedules that perform both existing deliveries and the added deliveries using one or more delivery routes that are to be performed by the fleet of vehicles and the team of drivers.

As additional examples, logistics management platform 220 can generate a set of modified schedules based on a request to remove a delivery from the schedule, a request to modify a delivery window of a delivery included in the schedule, and/or the like, in the same manner described above.

In some implementations, logistics management platform 220 can generate the set of modified schedules using a scheduling rule. The scheduling rule can be any rule capable of limiting or restricting possible delivery routes used to perform the set of deliveries. As an example, the scheduling rule can indicate that delivery routes included in modified schedules are to be generated without modifying delivery windows associated with deliveries that have already been scheduled.

As an example, if a first delivery has a delivery window between 3 PM and 5 PM, and the original schedule indicated that a first driver is to perform the delivery at 3 PM, logistics management platform 220 could generate a modified schedule with a delivery route to perform the first delivery at 4 PM (within the delivery window), but could not generate a modified schedule with a delivery route indicating to perform the first delivery at 6 PM (outside of the delivery window).

In some cases, the scheduling rule can be user-configurable. For example, a user can set or select one or more scheduling rules via a user interface of client device 210 to specify, define, set, and/or prioritize the scheduling rule used for generating the set of modified schedules.

In some implementations, logistics management platform 220 can generate one or more modified schedules using a delivery window different from that included in the request. For example, assume the request is a request to add a delivery to the schedule, and that the request includes a delivery window for the added delivery. In this case, logistics management platform 220 can determine that using another delivery window for the added delivery would reduce operational costs (as described further herein). Here, logistics management platform 220 can provide, to a device associated with a user that placed the added delivery, an offer to use the other delivery window in exchange for a lower delivery fee.

Additionally, logistics management platform 220 can receive, from the device associated with the user that placed the added delivery, a notification accepting the offer to use the other delivery window. In this case, logistics management platform 220 can generate the one or more modified schedules using the delivery window that is different from the delivery window included in the request. In this way, logistics management platform 220 is able to generate modified schedules that are beneficial to both end users and to delivery organizations performing the deliveries.

In this way, logistics management platform 220 is able to generate a set of modified schedules.

As further shown in FIG. 4, process 400 can include determining, for each modified schedule, of the set of modified schedules, one or more scores for ranking the set of modified schedules (block 430). For example, logistics management platform 220 can, for each modified schedule, of the set of modified schedules, determine a projected delivery time score that is based on a delivery window for an added delivery, an operational cost score, an overall score that is based on both the projected delivery time score and the operational cost score, and/or the like.

In some implementations, logistics management platform 220 can determine a projected delivery time score. For example, logistics management platform 220 can, for each modified schedule, determine a projected delivery time score based on a time at which an added delivery is projected to be performed. In this case, logistics management platform 220 can schedule an additional delivery into a particular time slot, and logistics management platform 220 can determine a projected delivery time score based on the particular time slot at which the additional delivery is to be performed. For example, logistics management platform 220 can assign lower scores to modified schedules associated with projected delivery times that are later in the day and can assign higher scores to modified schedules associated with projected delivery times that are earlier in the day. In other cases, logistics management platform 220 can assign scores based on whether a modified schedule includes a projected delivery time for the additional delivery that is within a delivery window indicated by an end-user.

Additionally, or alternatively, logistics management platform 220 can determine an operational cost score for each modified schedule of the set of modified schedules. For example, logistics management platform 220 can determine an operational cost score for a modified schedule by determining a fuel cost associated with vehicles performing one or more deliveries included in the modified schedule, a total amount of wages for drivers performing the one or more deliveries, and/or the like. In this case, logistics management platform 220 can determine a fuel cost based on an estimated total distance driven by vehicles performing the deliveries and an average cost of fuel in a geographic area around the deliveries. The average cost of fuel can be obtained from a webpage using a data mining technique. Additionally, logistics management platform 220 can estimate a total amount of time needed to perform the deliveries, and can use the estimated total amount of time needed to perform the deliveries to determine a total amount of wages for drivers performing the one or more deliveries (e.g., which can include hourly wages, or overtime wages if a particular driver is needed to work more than eight hours).

As an example, if the request is a request to remove a delivery from the schedule, logistics management platform 220 can determine an operational cost score for each modified schedule of the set of modified schedules. In this example, logistics management platform 220 can generate a set of modified schedules that each include different delivery routes for carrying out the set of deliveries (delivery routes that no longer include the removed delivery), and can determine an operational cost score for each modified schedule, in the same manner described above.

Additionally, or alternatively, logistics management platform 220 can determine an overall score for each modified schedule of the set of modified schedules. For example, logistics management platform 220 can determine an overall score for a modified schedule by taking an average or a weighted average of a projected delivery time score and an operational cost score. In this way, logistics management platform 220 is able to determine an overall score that considers both needs of a client organization and needs of an end-user.

In some implementations, logistics management platform 220 can determine one or more scores using a machine learning model. For example, logistics management platform 220 can train a machine learning model on historical scheduling information and historical scores relating to historical schedules. In this case, logistics management platform 220 can provide, as input to the machine learning model, routing information relating to delivery routes included in the set of modified schedules, which can cause the machine learning model to output a modified schedule that includes optimal delivery routes (e.g., delivery routes associated with an earliest available projected delivery time score, delivery routes associated with a lowest available operational cost score, a highest available overall score, etc.).

In this way, logistics management platform 220 is able to determine one or more scores that can be used for ranking the set of modified schedules.

As further shown in FIG. 4, process 400 can include providing the one or more scores to the client device and receiving, from the client device, a selected modified schedule (block 440). For example, logistics management platform 220 can provide the set of modified schedules for display on a user interface of client device 210. In this case, a user can interact with the user interface to select a modified schedules from the set of modified schedules.

In some implementations, the user interface can display the set of modified schedules. For example, the user interface can display, for each modified schedule, a total number of drivers associated with the modified schedule, a total number of deliveries to be made as part of the modified schedule, a delivery date for the deliveries, a schedule identifier, the one or more scores, a delivery window for a delivery to be added to the modified schedule, a projected delivery time to perform the added delivery, and/or the like.

In some implementations, the user interface can be used to sort the modified schedules based on the one or more scores or other factors. For example, a user can select a button on the user interface to sort based on projected delivery time scores, based on operational cost scores, based on overall scores, and/or the like. In this way, the user interface of client device 210 can provide a sorted display of the set of modified schedules based on the one or more scores.

In some implementations, a user can interact with the user interface to select a modified schedules of the set of modified schedules. For example, the user can select a modified schedules based on a projected delivery time score, based on an operational cost score, based on an overall score, and/or the like. In some implementations, the user selecting a particular modified schedule can cause an indication of the selection to be provided to logistics management platform 220.

In some implementations, rather than providing the one or more scores to client device 210, logistics management platform 220 can generate a recommendation as to which modified schedule to select. In this case, logistics management platform 220 can generate the recommendation based on the one or more scores and a configurable rule (e.g., a rule indicating to select a lowest available score), and can provide the recommendation for display on the user interface of client device 210.

In some implementations, rather than wait for the user to select a modified schedule, logistics management platform 220 can automatically select a modified schedule. For example, logistics management platform 220 can automatically select a modified schedule based on a trigger, such a threshold score (e.g., a threshold projected delivery time score, a threshold operational cost score, a threshold overall score, etc.).

In this way, logistics management platform 220 is able to provide the one or more scores to client device 210, and is able to receive a selected modified schedule that can be implemented in real-time.

As further shown in FIG. 4, process 400 can include deploying the selected modified schedule to instruct the fleet of vehicles to perform an updated set of deliveries (block 450). For example, logistics management platform 220 can deploy the selected modified schedule to instruct the fleet of vehicles to perform an updated set of deliveries. In this case, logistics management platform 220 can provide a notification to devices associated with each vehicle of the fleet of vehicles, that the updated set of deliveries is to be used as a current delivery schedule.

In some implementations, in addition to processing the request to modify the schedule, logistics management platform 220 can support a digital marketplace that provides an end user with dynamically updated delivery fees. For example, logistics management platform 220 can store delivery information (e.g., fee information for deliveries, location information for deliveries, etc.) relating to deliveries being performed in real-time. In this case, if a large volume of users need deliveries in the same geographic region, delivery fees for that geographic region might rise.

Additionally, logistics management platform 220 can set thresholds, such that if a delivery fee satisfies a threshold (e.g., a delivery fee exceeds a threshold amount), logistics management platform 220 can provide, to a user device 240, an offer including a different delivery fee in exchange for accepting a different delivery window, a different delivery location, and/or the like. In this case, logistics management platform 220 can generate additional modified schedules that include delivery routes that utilize the different delivery window, the different delivery location, and/or the like, and can determine additional scores to allow the additional modified schedules to be ranked and provided to client device 210. This can create a situation where the end user benefits from a lower price, while a delivery company also benefits by using more efficient delivery routes that are available in other delivery windows, thereby reducing operational cost.

In some implementations, logistics management platform 220 can automatically generate a recommendation to modify the selected schedule based on a change to the digital marketplace. For example, if prices associated with the digital marketplace drop below a particular price threshold, logistics management platform 220 can automatically generate and provide a recommendation to user device 240 and/or client device 210. In this way, delivery resources can be freed up to perform other deliveries or adjust to other real-time modifications.

In some implementations, logistics management platform 220 can generate and score additional modified schedules based on supplemental information. For example, logistics management platform 220 can obtain weather information and/or traffic information for a region associated with the set of deliveries, and can make modifications based on the weather information and/or traffic information. In this case, logistics management platform 220 can generate one or more additional modified schedules that include new optimal routes that are based in part on the weather information and/or the traffic information.

In some implementations, logistics management platform 220 can deploy the selected modified schedule using a fleet of autonomous vehicles. For example, logistics management platform 220 can deploy a fleet of autonomous vehicles (or a mixture of human-driven vehicles and autonomous vehicles). In this case, logistics management platform 220 can provide the modified schedule to one or more autonomous vehicles, and the one or more autonomous vehicles can implement the modified schedule. In some cases, logistics management platform 220 can automatically perform particular actions based on instructions included in the modified schedule, such as release a particular package, send devices associated with end users estimated delivery times, and/or the like.

In this way, logistics management platform 220 is able to deploy the selected modified schedule, and is able to perform one or more additional actions associated with managing the deployed schedule.

Although FIG. 4 shows example blocks of process 400, in some implementations, process 400 can include additional blocks, fewer blocks, different blocks, or differently arranged blocks than those depicted in FIG. 4. Additionally, or alternatively, two or more of the blocks of process 400 can be performed in parallel.

By scoring and ranking the set of modified schedules, logistics management platform 220 is able to identify one or more modified schedules that are beneficial both to a client organization and to end users. This conserves processing resources that might otherwise be used to generate inefficient delivery routes and process new requests made by the client device after receiving the inefficient delivery routes, conserves processing resources that might otherwise be used to generate delivery routes that cause drivers to miss deliveries during preferred delivery windows (which in turn leads to additional processing resources needed to add the missed delivery to a different schedule), conserves processing resources that might otherwise be used to execute error correction techniques, and/or the like. Furthermore, logistics management platform 220 reduces operational costs of the client organization, improves customer satisfaction by maximizing a number of end customers that receive deliveries within preferred delivery windows, and/or the like.

The foregoing disclosure provides illustration and description, but is not intended to be exhaustive or to limit the implementations to the precise form disclosed. Modifications and variations are possible in light of the above disclosure or can be acquired from practice of the implementations.

As used herein, the term component is intended to be broadly construed as hardware, firmware, or a combination of hardware and software.

Some implementations are described herein in connection with thresholds. As used herein, satisfying a threshold can refer to a value being greater than the threshold, more than the threshold, higher than the threshold, greater than or equal to the threshold, less than the threshold, fewer than the threshold, lower than the threshold, less than or equal to the threshold, equal to the threshold, or the like.

To the extent the aforementioned embodiments collect, store, or employ personal information provided by individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

It will be apparent that systems and/or methods, described herein, can be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features can be combined in ways not specifically recited in the claims and/or disclosed in the specification. Although each dependent claim listed below can directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and can be used interchangeably with "one or more." Furthermore, as used herein, the term "set" is intended to include one or more items (e.g., related items, unrelated items, a combination of related and unrelated items, etc.), and can be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
one or more memories; and
one or more processors, coupled to the one or more memories, to:
receive, from a client device, a request to modify a schedule that includes information identifying a set of deliveries that a fleet of vehicles is to perform, where the set of deliveries is associated with a set of delivery windows;
generate a set of modified schedules using information included in the request to modify the schedule and one or more routing techniques,
where the one or more processors, when generating the set of modified schedules, are to:
generate the set of modified schedules based on a scheduling rule indicating to generate the set of modified schedules in a way that does not interfere with the set of delivery windows,
where each modified schedule, of the set of modified schedules, includes information instructing the fleet of vehicles to use one or more delivery routes to perform an updated set of deliveries;
determine, for each modified schedule, of the set of modified schedules, one or more scores for ranking the set of modified schedules,
the one or more scores including at least one of:
a projected delivery time score that is based on a delivery window for an additional delivery included in the request to modify the schedule,
an operational cost score, or
an overall score that is based on the projected delivery time score and the operational cost score;
provide the set of modified schedules that have been scored to the client device, the client device to select a modified schedule, of the set of modified schedules, to cause the selected modified schedule to be sent to the device;
deploy the selected modified schedule to automatically instruct an autonomous vehicle of the fleet of vehicles to perform an updated set of deliveries associated with the selected modified schedule; and
cause the autonomous vehicle of the fleet of vehicles to implement the selected modified schedule based on deploying the selected modified schedule.

2. The device of claim 1, where the request to modify the schedule includes:
a request to add a delivery to the schedule that includes the information identifying the set of deliveries that the fleet of vehicles is to perform,
where the set of delivery windows identifies preferred delivery time periods.

3. The device of claim 1, where the request to modify the schedule includes at least one of:
a request to add a new delivery to the schedule,
a request to remove a delivery, of the set of deliveries, from the schedule, or
a request to modify a delivery window, of the set of delivery windows, used for a delivery, of the set of deliveries, included in the schedule.

4. The device of claim 1, where the request to modify the schedule includes:
a request to add a delivery to the schedule,
the request to add the delivery including a delivery window for the additional delivery; and
where the one or more processors are further to:
determine that using another delivery window for the additional delivery would reduce operational costs;
provide, to a device associated with a user that placed the additional delivery, an offer to use the other delivery window for the additional delivery in exchange for a lower delivery fee;
receive, from the device associated with the user that placed the additional delivery, a notification accepting the offer to use the other delivery window; and
where the one or more processors, when generating the set of modified schedules, are to:
generate the set of modified schedules using the other delivery window.

5. The device of claim 1, where the one or more processors, when determining the one or more scores, are to:
determine a set of projected delivery time scores for the additional delivery,
where each projected delivery time score, of the set of projected delivery time scores, is based on a time period at which the additional delivery is projected to be performed; and
where the one or more processors, when providing the set of modified schedules that have been scored to the client device, are to:
provide the set of modified schedules for display on a user interface of the client device,
where the user interface is able to provide a sorted display of the set of modified schedules based on the set of projected delivery time scores.

6. The device of claim 1, where the one or more processors, when determining the one or more scores for ranking the set of modified schedules, are to:
determine, for the set of modified schedules, a set of operational cost scores,
where each operational cost score is based on at least one of:
a cost of fuel needed for one or more vehicles to perform the updated set of deliveries, or
a total amount of wages for one or more drivers performing the updated set of deliveries; and
where the one or more processors, when providing the set of modified schedules that have been scored to the client device, are to:
provide the set of modified schedules for display on a user interface of the client device,
where the user interface is able to provide a sorted display of the set of modified schedules based on the set of operational cost scores.

7. The device of claim 1, where the one or more processors, when providing the set of modified schedules to the client device, are to:
provide the set of modified schedules for display on a user interface of the client device, the user interface to display at least one of:
a first ranked set of modified schedules based on a set of projected delivery time scores,
a second ranked set of modified schedules based on a set of operational cost scores, or
a third ranked set of modified schedules based on a set of overall scores.

8. A non-transitory computer-readable medium storing instructions, the instructions comprising:
one or more instructions that, when executed by one or more processors, cause the one or more processors to:
receive, from a client device, a request to modify a schedule that includes information identifying a set of deliveries that a fleet of vehicles is to perform, where the set of deliveries is associated with a set of delivery windows;
generate a set of modified schedules using information included in the request to modify the schedule and one or more routing techniques,
wherein the one or more instructions, that cause the one or more processors to generate the set of modified schedules, cause the one or more processors to:
generate the set of modified schedules based on a scheduling rule indicating to generate the set of modified schedules in a way that does not interfere with the set of delivery windows,
and
where each modified schedule, of the set of modified schedules, includes information instructing the fleet of vehicles to use one or more delivery routes to perform an updated set of deliveries;
determine, for each modified schedule, of the set of modified schedules, one or more scores for ranking the set of modified schedules,
the one or more scores including at least one of:
a projected delivery time score that is based on a delivery window for an additional delivery included in the request to modify the schedule,
an operational cost score, or
an overall score that is based on the projected delivery time score and the operational cost score;
provide the set of modified schedules that have been scored to the client device, the client device to select a modified schedule, of the set of modified schedules, to cause the selected modified schedule to be sent to the device;
deploy the selected modified schedule to automatically instruct an autonomous vehicle of the fleet of vehicles to perform an updated set of deliveries associated with the selected modified schedule; and
cause the autonomous vehicle of the fleet of vehicles to implement the selected modified schedule based on deploying the selected modified schedule.

9. The non-transitory computer-readable medium of claim 8, where the request to modify the schedule includes:
a request to add a delivery to the schedule that includes the information identifying the set of deliveries that the fleet of vehicles is to perform,
where the set of delivery windows identifies preferred delivery time periods.

10. The non-transitory computer-readable medium of claim 8, where the request to modify the schedule is received from the client device,
where the request to modify the schedule is a request to add a delivery to the schedule,
where the client device generates the request to modify the schedule based on receiving a delivery request from a device associated with an end user that placed the delivery request, and
where the device associated with the end user places the delivery request by interacting with a digital marketplace to select a particular delivery window and a delivery fee based on dynamically updated demand associated with deliveries in a geographic area near the additional delivery.

11. The non-transitory computer-readable medium of claim 8, where the request to modify the schedule includes:
a request to add a delivery,
the information included in the request to add the delivery including:
delivery location information for the additional delivery, and
delivery window information indicating a preferred delivery window for the additional delivery; and
where the one or more instructions, that cause the one or more processors to generate the set of modified schedules, cause the one or more processors to:
provide the delivery location information and the delivery window information for the additional delivery and delivery location information and delivery window information for the set of deliveries associated with the schedule as input to a routing technique of the one or more routing techniques to cause the routing technique to output the set of modified schedules.

12. The non-transitory computer-readable medium of claim 8, where the one or more instructions, that cause the one or more processors to determine the one or more scores for ranking the set of modified schedules, cause the one or more processors to:
provide routing information relating to delivery routes included in the set of modified schedules as input to a machine learning model that has been trained on historical scheduling information and historical scores,
the machine learning model to output a particular modified schedule, of the set of modified schedules, that includes one or more delivery routes associated with at least one of the following:
an earliest available projected delivery time score,
a lowest available operational cost score, or
a highest available overall score; and
where the one or more instructions, that cause the one or more processors to provide the set of modified schedules to the client device, cause the one or more processors to:
provide the particular modified schedule to the client device.

13. The non-transitory computer-readable medium of claim 8, where the one or more instructions, that cause the one or more processors to determine the one or more scores for the set of modified schedules, cause the one or more processors to:
determine a set of projected delivery time scores for the additional delivery,
where each projected delivery time score, of the set of projected delivery time scores is based on a time period at which the additional delivery is projected to be performed;
determine a set of operational cost scores,
where each operational cost score is based on at least one of:
a cost of fuel associated with vehicles performing the updated set of deliveries, or
a total amount of wages for one or more drivers performing the updated set of deliveries; and
determine a set of overall scores by taking an average or a weighted average of the set of operational cost scores and the set of projected delivery time scores.

14. The non-transitory computer-readable medium of claim 8, where the request to modify the schedule includes:
a request to add a delivery to the schedule,
the request to add the delivery including a particular delivery window for the additional delivery;
where the one or more instructions, that cause the one or more processors to generate the set of modified schedules, cause the one or more processors to:

generate one or more modified schedules, of the set of modified schedules, using a delivery window other than the particular delivery window included in the request to modify the schedule;
where the one or more instructions, that cause the one or more processors to determine the one or more scores for ranking the set of modified schedules, cause the one or more processors to:
    determine a set of operational cost scores for the set of modified schedules,
        the set of operational cost scores including one or more operational cost scores for the one or more modified schedules that use the other delivery window,
    determine that a modified schedule, of the one or more modified schedules that use the other delivery window, has a lowest available operational cost score of the set of modified schedules,
    provide, to a device associated with a user that placed the additional delivery, an offer to use the other delivery window for the additional delivery in exchange for a lower delivery fee,
    receive, from the device associated with the user that placed the additional delivery, a notification accepting the offer to use the other delivery window; and
where the one or more instructions, that cause the one or more processors to provide the sets of modified schedules to the client device, cause the one or more processors to:
    provide a notification to the client device that the device associated with the user that has placed the additional delivery has accepted the other delivery window in exchange for the lower delivery fee.

15. A method, comprising:
receiving, by a device and from a client device, a request to modify a schedule that includes information identifying a set of deliveries that a fleet of vehicles is to perform,
    where the set of deliveries is associated with a set of delivery windows;
generating, by the device, a set of modified schedules using information included in the request to modify the schedule and one or more routing techniques,
where generating the set of modified schedules comprises:
    generating the set of modified schedules based on a scheduling rule indicating to generate the set of modified schedules in a way that does not interfere with the set of delivery windows, and
    where each modified schedule, of the set of modified schedules, includes information instructing the fleet of vehicles to use one or more delivery routes to perform an updated set of deliveries;
determining, by the device and for each modified schedule, of the set of modified schedules, one or more scores for ranking the set of modified schedules,
    the one or more scores including at least one of:
        a projected delivery time score that is based on a delivery window for an additional delivery included in the request to modify the schedule,
        an operational cost score, or
        an overall score that is based on the projected delivery time score and the operational cost score;
providing, by the device, the set of modified schedules that have been scored to the client device,
    the client device to select a modified schedule, of the set of modified schedules, to cause the selected modified schedule to be sent to the device;
deploying, by the device, the selected modified schedule to automatically instruct an autonomous vehicle of the fleet of vehicles to perform an updated set of deliveries associated with the selected modified schedule; and
causing, by the device, the autonomous vehicle of the fleet of vehicles to implement the selected modified schedule based on deploying the selected modified schedule.

16. The method of claim 15, where the request to modify the schedule includes:
a request from the client device,
    where the request to modify the schedule is a request to add a delivery to the schedule,
    where the client device generates the request to modify the schedule based on receiving a delivery request for the delivery from a device associated with an end user placing the delivery request, and
    where the device associated with the end user places the delivery request by interacting with a digital marketplace to select a particular delivery window and a delivery fee based on dynamically updated demand associated with deliveries in a geographic area near the additional delivery.

17. The method of claim 15, where the request to modify the schedule includes:
a request to add a delivery to the schedule that includes the information identifying the set of deliveries that the fleet of vehicles is to perform,
    where the set of delivery windows identifies preferred delivery time periods.

18. The method of claim 15, where determining the one or more scores comprises:
determining a set of projected delivery time scores for the additional delivery,
    where each projected delivery time score, of the set of projected delivery time scores is based on a time period at which the additional delivery is projected to be performed,
determining a set of operational cost scores,
    where each operational cost score is based on a cost of fuel associated with vehicles performing the updated set of deliveries or a total amount of wages for one or more drivers performing the updated set of deliveries, and
determining a set of overall scores by taking an average or a weighted average of the set of operational cost scores and the set of projected delivery time scores.

19. The method of claim 15, where the request includes:
a request to add a delivery to the schedule,
    the request to add the delivery including a particular delivery window for the additional delivery;
the method further comprising:
    determining that using a different delivery window would reduce operational costs;
    providing, to a device associated with a user that placed the additional delivery, an offer to use the different delivery window for the additional delivery in exchange for a lower delivery fee; and
    receiving, from the device associated with the user that placed the additional delivery, a notification accepting the offer to use the different delivery window; and
where generating the set of modified schedules comprises:
    generating the set of modified schedules based on the different delivery window.

20. The method of claim 15, where providing the set of modified schedules comprises:
  providing the set of modified schedules for display on a user interface of the client device,
    the user interface to display at least one of:
      a first ranked set of modified schedules based on a set of projected delivery time scores,
      a second ranked set of modified schedules based on a set of operational cost scores, or
      a third ranked set of modified schedules based on a set of overall scores.

* * * * *